Feb. 25, 1969  R. W. HENKE  3,429,229

FLUID DRIVE MECHANISM

Filed Oct. 17, 1966

INVENTOR
RUSSELL W. HENKE
BY
Andrus & Starke
Attorneys

United States Patent Office 3,429,229
Patented Feb. 25, 1969

3,429,229
FLUID DRIVE MECHANISM
Russell W. Henke, Elm Grove, Wis., assignor to Jordan Controls, Inc., Milwaukee, Wis., a corporation of Wisconsin
Filed Oct. 17, 1966, Ser. No. 587,199
U.S. Cl. 91—87          10 Claims
Int. Cl. F01c *1/18;* F15c *1/14*

ABSTRACT OF THE DISCLOSURE

A fluid operated motor or generator having a stepped output. Hydraulic fluid is supplied to the interior of the outer casing, which contains a pair of meshing gears, through a pair of inlet ports and one inlet port is located within the circle inscribed by the outer tips of the teeth of one of the gears, while the second inlet port is located within the circle inscribed by the outer tips of the teeth of the second gear. The inlet ports are arranged with respect to one another so that one port will be closed by the corresponding gear teeth while the other inlet port is open.

In addition, a pair of outlet ports are similarly arranged on the opposite side of the centerline of the casing from the inlet ports.

Pulsating hydraulic fluid having a substantially uniform pulse width, is supplied to the inlet ports to thereby provide a stepped output for the gears.

---

This invention relates to a fluid drive mechanism and more particularly to a fluid operated step motor or generator having an output which moves a predetermined increment for a command input.

The output of a step motor is designed to move in predetermined steps or increments for a given command input. The stepped output is useful in positioning systems such as the positioning of machine tools, valve stem operation, web handling equipment in papermaking machines, and the like.

The present invention is directed to a novel fluid operated unit having a stepped output and which does not require a linear-to-rotary conversion mechanism. The unit includes an outer casing, and a pair of rotary positive displacement elements or gears are mounted for rotation on generally parallel shafts within the casing. The gears are provided with meshing teeth.

When used as a motor, hydraulic fluid is supplied to the interior of the casing through a pair of inlet ports which are positioned on one side of the centerline of the motor, and each inlet port is located within the circle inscribed by the outer tips of the teeth of the corresponding gear. The inlet ports are arranged with respect to one another so that one of the inlet ports will be closed by the corresponding gear teeth while the other inlet opening is open. As the gears rotate, the first inlet port will be progressively opened while the second inlet port will be progressively closed by the teeth of the corresponding gear, until the first inlet port is completely open and the second inlet port is closed.

In addition, a pair of outlet ports are similarly arranged on the opposite side of the center line of the casing from the inlet ports. As in the case of the inlet ports, one of the outlet ports is located within the circle inscribed by the tips of the teeth of one of the gears, while the second outlet port is located within the circle inscribed by the teeth of the second of the gears. The outlet ports are arranged with respect to the gear teeth so that one of the outlet ports will be completely closed by the teeth of the corresponding gear, while the other port is completely open.

Each of the inlet ports is connected to a fluid supply line and in one form of the invention a pulse generator is connected to the supply lines and provides a fluid pulse of constant width. As the series of pulses is applied to the supply lines, the gears rotate or index in a series of steps, with each step normally being equal to one-half the pitch arc of the gear teeth, to thereby provide a stepped output for the motor.

In a second form of the invention, a shuttle valve is employed to alternately connect each supply line to a source of fluid under pressure. In this embodiment, fluid is supplied through one of the inlet ports to the interior of the casing during a timed interval to move the gears, and after the timed interval the shuttle valve reverses its position to close the first supply line and open the second supply line with the result that the hydraulic fluid is then supplied to the casing through the second inlet port. The period when the valve switches from one supply line to the other provides a period of dwell and thus provides a stepped output.

The fluid operated drive mechanism of the invention is a simple and effective mechanism for providing a stepped output which can be used in various types of systems. By reversing the system and driving the motor, the unit can be used as a pulse generator to generate a series of pulses of uniform width as the gears are driven. As a pulse generator, the unit can be utilized to drive one or more stepped fluid motors or other devices which require a pulsed input.

Other objects and advantages will appear in the course of the following description.

The drawings illustrate the best mode presently contemplated of carrying out the invention.

Figure 1:
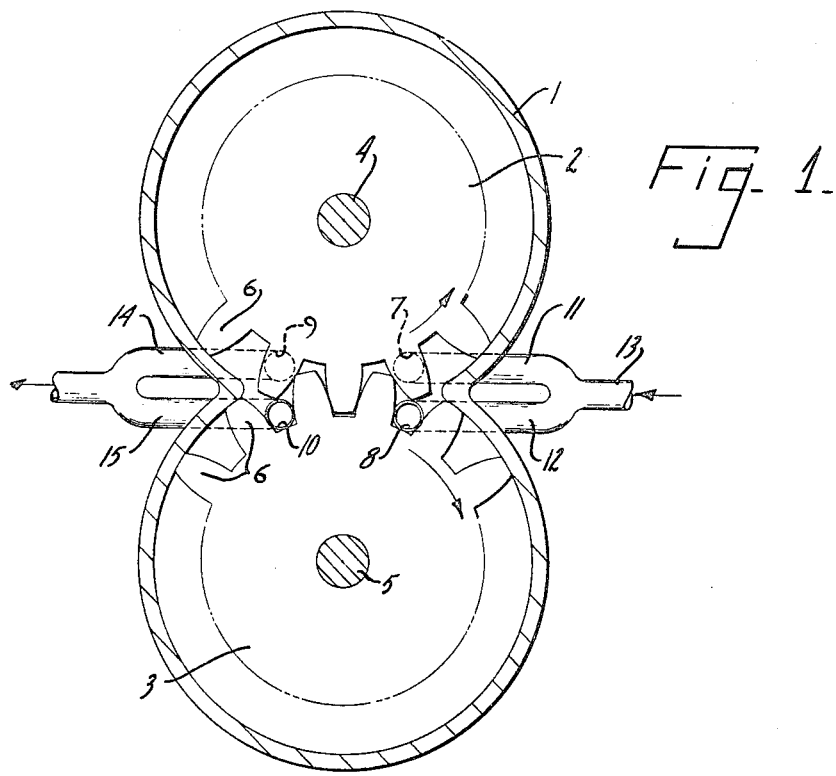
FIG. 1 is a diagrammatic sectional view of a gear motor employing the invention and showing the gears in a first position where one of the fluid inlet ports is completely open and the second inlet port is completely closed.

The drawings illustrate a fluid drive unit comprising an outer casing 1 which houses a pair of gears 2 and 3. The gears 2 and 3 are mounted on shafts 4 and 5, respectively, which are journalled within the walls of the casing, and the gears each carry a series of teeth 6 which are in meshing engagement.

According to the invention, hydraulic fluid is supplied to the interior of casing 1 through a pair of inlet ports 7 and 8, and fluid is discharged from the casing through a pair of outlet ports 9 and 10.

To supply fluid pressure to the inlet ports, supply lines 11 and 12 are connected to the ports 7 and 8, respectively, and supply lines 11 and 12 are connected to a common hydraulic fluid line 13. Similarly, the outlet ports 9 and 10 are connected to return lines 14 and 15, respectively, which are connected to a suitable reservoir for hydraulic fluid.

The gear motor of the invention has a stepped output in which the gears move in a series of predetermined steps or increments for a command input pulse. Any conventional pulse generating mechanism can be employed to provide a series of pulses of uniform width in the line 13. For example, a piston pump unit can be connected to the line 13 and each stroke of the piston will provide a pulse of substantially uniform width. Alternately, a fluid unit, similar to that described, can be driven to provide a pulse generating unit which can then be utilized to provide the pulsed input for the motor shown in FIG. 1.

The arrangement of the inlet ports 7 and 8, as well as the outlet ports 9 and 10, with repsect to the gear teeth 6, is an important feature of the invention. Each inlet port 7 and 8 is positioned within the circle inscribed by the outer tips of the corresponding gear teeth 6 and the circle inscribed by the bases of the corresponding teeth, so that the inlet port will be successively opened and closed by the corresponding teeth as the gear rotates. As a further limitation, each inlet port should be located outside of the circle inscribed by the outer tips of the teeth of the other gear. Thus, inlet port 7 is located outside of the circle inscribed by the teeth of gear 3, so that the teeth of gear 3 will not close off inlet port 7 during rotation of the gear 3.

Inlet ports 7 and 8 are located on one side of the centerline extending through shafts 4 and 5, while outlet ports 9 and 10 are arranged on the other side of the centerline.

Figure 2:
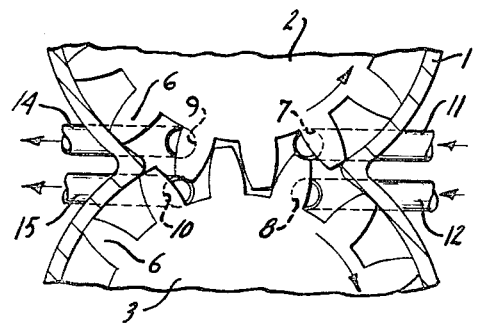
FIG. 2 is a view similar to FIG. 1 showing the gears in a second position where the first inlet port is partially open and the second inlet port is partially closed.
Figure 3:
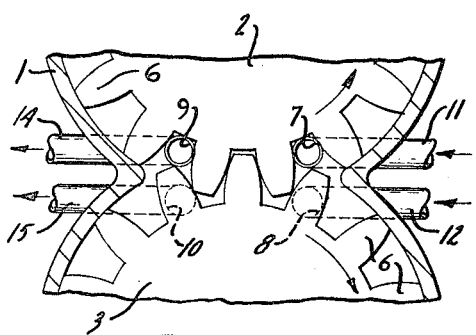
FIG. 3 is a view similar to FIG. 2 showing the gears in a third position where the second inlet port is completely open and the first inlet port is closed.

The ports 7 and 8 are also arranged so that the port 8 is completely open, as shown in FIG. 1, while the other inlet port 7 is completely closed off by the teeth of gear 2. As the hydraulic fluid is introduced into line 12 through the open inlet port 8, the pressure of the fluid will act against the teeth to rotate the gears in the direction of the arrows. The rotation of the gears results in the inlet port 8 being progressively closed by the next succeeding tooth in gear 3, while the inlet port 7 is progressively opened as the gear 2 is rotated. This is shown in FIG. 2. Further rotation of the gears results in the inlet port 8 being completely closed off by the teeth of gear 3, as shown in FIG. 3, while the inlet port 7 is completely open. To achieve this arrangement, the pulse width is related to the number and size of the gear teeth as well as to the location of inlet ports 7 and 8, so that at both the beginning and at the end of each pulse, one of the inlet ports will be completely open and the other inlet port will be completely closed. For most applications, the pulse width is designed to index the gear teeth one step which is generally equal to one-half the pitch arc of the teeth.

As a further consideration, the diameter of inlet ports 7 and 8 should be equal to, or less than the width of teeth 6, so that at least one of the inlet ports will be partially open at all times. With this arrangement the gears will be rotated one step for each pulse, resulting in a stepped output for the gears 2 and 3. The stepped output of the motor can be utilized in driving any type of apparatus. For example, the stepped output can be utilized to actuate a valve stem, to position machine tools, to actuate web handling equipment in papermaking machines, or the like.

Figure 4:
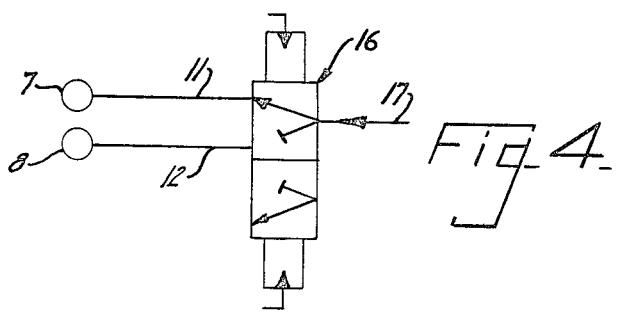
FIG. 4 is a schematic representation showing a modified form of the invention in which a shuttle valve is employed to alternately apply fluid pressure to the inlet ports.

FIG. 4 illustrates a modified form of the invention in which a two-position, three-way shuttle valve 16 alternately connects fluid line 17 with the supply lines 11 and 12. Hydraulic fluid under constant pressure in line 17, or fluid having a non-uniform pulse width, is alternately supplied through line 11 to inlet port 7 and through line 12 to inlet port 8 by operation of valve 16. The shuttle valve 16 is of a conventional type and may take the form of a piston valve or rotary valve and can be driven or actuated by an electronic, mechanical or hydraulic system. Valve 16 is designed to connect line 17 to line 11 for a given period of time and then switch and connect line 17 to line 12 for a similar period of time. The time interval during which the valve 16 is switching from one line to the other provides a period of dwell for the gears 2 and 3 and thus results in a stepped output for the motor.

The motor shown in FIG. 4 operates similar to that described with respect to the motor shown in FIGS. 1–3. When valve 16 connects the line 17 with line 11, fluid is supplied to the casing through inlet port 7, thereby rotating the gears 2 and 3. After a predetermined time interval which is correlated with the size and number of gear teeth 6, as well as with the position of the inlet ports 7 and 8, the valve 16 is reversed to open the connection between line 17 and line 12 and close the connection to line 11, and thereby supply fluid through inlet port 8. As previously mentioned, the time intervals during which the shuttle valve is switching from one line to the other provides a series of dwell periods during which the gears do not rotate, thereby resulting in a stepped output.

The fluid drive unit of the invention can be used either as a motor or a pulse generator. When used as a motor, a pulsed input is utilized to provide a stepped output for the motor through the arrangement of the inlet and outlet ports with respect to the teeth of the gears 2 and 3. The direction of rotation of the stepped output can be conveniently reversed by reversing the fluid flow and introducing fluid to the casing through ports 9 and 10 and withdrawing fluid through ports 7 and 8.

When used as a pulse generator, shafts 4 and 5 are driven by any conventional drive mechanism and rotation of the gears will provide a pulsed output through the lines 11 and 12 and line 13. This output having pulses of uniform width can then be utilized to operate one or a series of motors similar to that shown in FIG. 1, or it can be used as a command input for any other type of fluid device requiring a pulsed input. When used as a pulse generator, the inlet and outlet porting would have to be arranged with respect to the gear teeth to provide the desired pulsating action.

Various modes of carrying out the invention are contemplated as being within the scope of the following claims particularly pointing out and distinctly claiming the subject matter which is regarded as the invention.

I claim:

1. In a fluid operated drive unit, an outer casing defining a gear chamber, a pair of gears mounted for rotation in the chamber and having intermeshing teeth, first port means communicating with said chamber and connected to a source of hydraulic fluid, and second port means communicating with said chamber and connected to a source of hydraulic fluid, said first port means communicating with said chamber at a location between the circle inscribed by the outer tips of the teeth of a first of said gears and the circle inscribed by the bases of the teeth of said first gear, said second port means communicating with said chamber at a location between the circle inscribed by the outer tips of the teeth of the second of said gears and the circle inscribed by the bases of the teeth of said second gear, said first and second port means being arranged with respect to the teeth of said gears so that said first port means is substantially completely closed by the teeth of said first gear when said second port means is substantially completely open, and said second port means is substantially completely closed by the teeth of said second gear when said first port means is substantially open.

2. The drive unit of claim 1, in which said first port means is located outside of the circle inscribed by the outer tips of the teeth of said second gear, and said second port means is located outside of the circle inscribed by the outer tips of the teeth of said first gear.

3. The drive unit of claim 1, in which the first and second port means are located on one side of a plane extending parallel to the axes of the gears and extending through said axes.

4. The drive unit of claim 1, in which said source of hydraulic fluid is a pulsed source having a substantially uniform pulse width.

5. The drive unit of claim 4 and including first outlet port means communicating with said chamber, and second outlet port means communicating with said chamber, said first outlet port means communicating with said chamber at a location between the circle inscribed by the outer tips of the teeth of said first gear and the circle inscribed by the bases of the teeth of said first gear, said second outlet port means communicating with said chamber at a location between the circle inscribed by the outer tips of the teeth of said second gear and the circle inscribed by the bases of the teeth of said second gear, said first and second outlet port means being arranged with respect to the teeth of said gears so that said first outlet port means is substantially completely closed by the teeth of said first gear when said second outlet port means is substantially completely open, and said second outlet port means is substantially completely closed by the teeth of said second gear when said first outlet port means is substantially open.

6. The drive unit of claim 1, in which the diameter of said first and second port means is approximately equal to the width of the gear teeth at a location midway of the depth of the teeth.

7. In a fluid operated motor having a stepped output, an outer casing defining a gear chamber, a pair of gears mounted for rotation in the chamber and having intermeshing teeth, first inlet port means communicating with said chamber and connected to a first hydraulic fluid line, second port means communicating with said chamber and connected to a second hydraulic fluid line, said first port means communicating with said chamber at a location between the circle inscribed by the outer tips of the teeth of a first of said gears and the circle inscribed by the bases of the teeth of said first gear, said second port means communicating with said chamber at a location between the circle inscribed by the outer tips of the teeth of the second of said gears and the circle inscribed by the bases of the teeth of said second gear, said first and second port means being arranged with respect to the teeth of said gears so that said first port means is substantially completely closed by the teeth of said first gear when said second port means is substantially completely open, and said second port means is substantially completely closed by the teeth of said second gear when said first port means is substantially open, and means for supplying pulsating hydraulic fluid having a substantially uniform pulse width to said first and second hydraulic fluid lines.

8. The motor of claim 7, in which the pulse width is arranged so that one of said inlet port means is substantially completely open at the start of said pulse and is substantially completely closed at the end of said pulse.

9. In a fluid operated motor having a stepped output, an outer casing defining a gear chamber, a pair of gears mounted for rotation in the chamber and having intermeshing teeth, first inlet port means communicating with said chamber and connected to a first hydraulic fluid line, second port means communicating with said chamber and connected to a second hydraulic fluid line, said first port means communicating with said chamber at a location between the circle inscribed by the outer tips of the teeth of a first of said gears and the circle inscribed by the bases of the teeth of said first gear, said second port means communicating with said chamber at a location between the circle inscribed by the outer tips of the teeth of the second of said gears and the circle inscribed by the bases of the teeth of said second gear, said first and second port means being arranged with respect to the teeth of said gears so that said first port means is substantially completely closed by the teeth of said first gear when said second port means is substantially completely open, and said second port means is substantially completely closed by the teeth of said second gear when said first port means is substantially open, conduit means connected to a source of hydraulic fluid under pressure, and valve means for alternately connecting said conduit means to said first and second hydraulic fluid lines.

10. The motor of claim 9, in which the valve means is arranged to connect said conduit means to said first hydraulic fluid line for a given period of time and is arranged to connect said conduit means to said second hydraulic fluid line for the same period of time.

References Cited

UNITED STATES PATENTS

| | | | |
|---|---|---|---|
| 423,289 | 3/1890 | Tilden | 91—56 X |
| 953,964 | 4/1910 | Miles | 91—86 |
| 1,023,360 | 4/1912 | Brauer | 91—87 |
| 2,757,559 | 8/1956 | Carpenter | 74—820 |
| 2,871,831 | 2/1959 | Patin | 91—56 |
| 2,919,682 | 1/1960 | Chien-Bor Sung | 103—126 X |
| 3,137,238 | 6/1964 | Gordon | 103—126 X |

FOREIGN PATENTS 1,021,809  12/1957  Germany.

EVERETTE A. POWELL, Jr., *Primary Examiner.*

U.S. Cl. X.R.

137—81.5